United States Patent
Moon

(10) Patent No.: US 11,036,792 B2
(45) Date of Patent: Jun. 15, 2021

(54) METHOD FOR DESIGNATING AND TAGGING ALBUM OF STORED PHOTOGRAPHS IN TOUCHSCREEN TERMINAL, COMPUTER-READABLE RECORDING MEDIUM, AND TERMINAL

(71) Applicant: VIMIO CO. LTD, Seoul (KR)

(72) Inventor: Bong Jae Moon, Seoul (KR)

(73) Assignee: VIMIO CO. LTD, Seoul (KR)

( * ) Notice: Subject to any disclaimer, the term of this patent is extended or adjusted under 35 U.S.C. 154(b) by 161 days.

(21) Appl. No.: 16/338,023

(22) PCT Filed: Sep. 28, 2017

(86) PCT No.: PCT/KR2017/010840
§ 371 (c)(1),
(2) Date: Apr. 29, 2019

(87) PCT Pub. No.: WO2018/062901
PCT Pub. Date: Apr. 5, 2018

(65) Prior Publication Data
US 2020/0142925 A1  May 7, 2020

(30) Foreign Application Priority Data

Sep. 29, 2016  (KR) .......................... 10-2016-0125320

(51) Int. Cl.
*G06F 16/58* (2019.01)
*G06F 3/01* (2006.01)
(Continued)

(52) U.S. Cl.
CPC .......... *G06F 16/5866* (2019.01); *G06F 3/017* (2013.01); *G06F 3/04847* (2013.01); *G06F 16/583* (2019.01); *G06F 16/587* (2019.01)

(58) Field of Classification Search
CPC .. G06F 16/5866; G06F 16/583; G06F 16/587; G06F 3/017; G06F 3/04847;
(Continued)

(56) References Cited

U.S. PATENT DOCUMENTS

| 2011/0134276 | A1 | 6/2011 | Choi | |
| 2011/0321044 | A1* | 12/2011 | Huh | G06F 9/45533 718/1 |
| 2013/0125069 | A1* | 5/2013 | Bourdev | G06F 3/04845 715/863 |

FOREIGN PATENT DOCUMENTS

| KR | 20070115194 | 12/2007 |
| KR | 20110028811 | 3/2011 |

(Continued)

OTHER PUBLICATIONS

International Search Report—PCT/KR2017/010840 dated Jan. 12, 2018.

*Primary Examiner* — Siamak Harandi
(74) *Attorney, Agent, or Firm* — Cantor Colburn LLP

(57) ABSTRACT

Provided is a method of classifying, into an album, one or more image files stored in a terminal with a screen to which a touch screen is applied. Album/folder information included in the terminal is confirmed. An image file stored in the terminal is displayed on the screen of the terminal. It is determined whether a predetermined specific gesture is input with respect to the image file. When the specific gesture is input, it is determined whether the album/folder information is stored. When it is determined that the album/folder information is not stored, album/folder information is recommended. Both or one of the recommended album/folder information and the stored album/folder information is displayed on the screen of the terminal. It is determined to which album/folder information a drag is made among the album/folder information displayed on the screen of the
(Continued)

terminal. The image file is moved to an album/folder corresponding to the album/folder information to which the drag has been made.

16 Claims, 13 Drawing Sheets

(51) Int. Cl.
    *G06F 16/583*     (2019.01)
    *G06F 16/587*     (2019.01)
    *G06F 3/0484*     (2013.01)

(58) Field of Classification Search
    CPC .. G06F 3/0482; G06F 3/04883; G06F 3/0486; G06N 20/00; G06K 9/00624
    See application file for complete search history.

(56) References Cited

FOREIGN PATENT DOCUMENTS

| | | |
|---|---|---|
| KR | 20110062383 | 6/2011 |
| KR | 20130048960 | 5/2013 |
| KR | 20150017188 | 2/2015 |

\* cited by examiner

METHOD FOR DESIGNATING AND TAGGING ALBUM OF STORED PHOTOGRAPHS IN TOUCHSCREEN TERMINAL, COMPUTER-READABLE RECORDING MEDIUM, AND TERMINAL

TECHNICAL FIELD

The present invention relates to a method of designating and tagging an album or a folder for photographs stored in a touch screen terminal such as a smartphone, and a computer-readable recording medium and a terminal therefor.

BACKGROUND ART

Recently, as large-capacity digital devices such as cameras, cellular phones, smartphones, and smart pads have come into widespread use, the number of users who take photographs using such a device is increasing.

In particular, as the camera performance of the digital device continues to develop, it becomes common for users to take photographs with smart devices and thus, many photographs are stored in smart devices. Accordingly, the stored photographs have to be organized into folders or albums with a lot of time by the users.

Generally, if taken photographs are not classified in advance into folders or are stacked without being tagged, many efforts need to be made to find a desired photograph when needed, which is the experience that anyone who uses smart devices must have undergone at least once.

When looking into the current photograph management service of Apple's iPhone or Android devices, in the case of iPhone, photographs can be classified into albums basically through a PC host terminal device called iTunes or a network-based cloud, and in the case of Android or Google, photographs can be classified into albums through the own photograph service (Google photos).

SUMMARY OF INVENTION

Technical Problem

The method of categorizing photographs into albums and folders as described above has not changed significantly since the development of the graphic user interface (GUI)-based systems in the early days until the development of current smart devices with a touch screen. That is, in terms of the GUI only, most of the methods are to first create albums or folders, determine folder names, and then select and move photographs to those folders.

It is considered that since such a method is intuitive and users are already familiar with mouse or keyboard type input devices earlier than touch screens, such a method is also employed in smart devices to move and store photographs in folders. However, although input methods of a touch screen and a mouse/keyboard should be fundamentally different, there are many cases in which almost the same method is applied thereto, thereby causing inconvenience to users.

The present invention is directed to technical improvement in a method for dividing photograph data stored in a touchscreen-based terminal in units of folders in a more efficient and convenient manner, designating albums therefor, and further assigning tags thereto, and to an application of the technique to a photograph storage and management service.

Solution to Problem

According to the present invention, there is provided a method of classifying, into an album, one or more image files stored in a terminal with a screen to which a touch screen is applied, the method including (1) a step of confirming album/folder information included in the terminal; (2) a step of displaying an image file stored in the terminal on the screen of the terminal; (3) a step of determining whether a predetermined specific gesture is input with respect to the image file; (4) when the specific gesture is input, a step of determining whether the album/folder information is stored; (5) when it is determined in step (4) that the album/folder information is not stored, a step of recommending album/folder information; (6) a step of displaying both or one of the album/folder information recommended in step (5) and the stored album/folder information on the screen of the terminal; (7) a step of determining to which album/folder information a drag is made among the album/folder information displayed on the screen of the terminal; and (8) a step of moving the image file to an album/folder corresponding to the album/folder information to which the drag has been made.

Step (1) may include identifying a folder including image files among folders included in a storage of the terminal as an album, and storing a name of the album as the album/folder information.

In step (3), the specific gesture may include touching and holding the screen for a long time.

Step (8) may include tagging the image file with a phrase corresponding to the album/folder information, together with the movement of the image file.

The recommendation of the album/folder information in step (5) may include recommending information received from an external server connected to the terminal via wire or wirelessly, and album/folder information related to the image file may be recommended from the external server through machine learning.

The information received from the external server may include one of: information obtained by conducting image recognition on the image file; and information regarding a location identified by conducting GPS recognition on the image file.

The recommendation of the album/folder information in step (5) may include recommending one of: information obtained by conducting image recognition on the image file in the terminal; and information regarding a location identified by conducting GPS recognition on the image file in the smart device.

Step (1) may be performed between steps (2) and (3) or between steps (3) and (4).

When a plurality of pieces of album/folder information are displayed in step (6), the plurality of pieces of album/folder information may be arranged around the point on the screen where the user is touching.

When the plurality of pieces of album/folder information are n pieces of information, the n pieces of information may be arranged radially around the point on the screen where the user is touching to be spaced from each other at an angle of 360/n degrees.

When the number of the plurality of pieces of album/folder information exceeds a certain number, the plurality of pieces of album/folder information may be displayed in two or more virtual concentric circles.

Previously stored album/folder information confirmed in step (1) among the plurality of pieces of album/folder information may be displayed in an inner first concentric circle, and the album/folder information recommended in step (5) among the plurality of pieces of album/folder information may be displayed in the inner first concentric circle when there is a free space in the first concentric circle and may be displayed in a concentric circle outside the first concentric circle when there is no free space in the first concentric circle.

Previously stored album/folder information confirmed in step (1) and the album/folder information recommended in step (5) among the plurality of pieces of album/folder information may be displayed in different forms to be visually distinguished from each other.

Previously stored album/folder information confirmed in step (1) and the album/folder information recommended in step (5) among the plurality of pieces of album/folder information may be displayed with a time difference.

According to the present invention, there is provided a computer-readable recording medium having recorded thereon either a program or an application for smart devices for executing the above-described method of classifying image files into albums in the terminal.

According to the present invention, there is provided a terminal with a screen to which a touch screen is applied, the terminal configured to be used to implement the above-described method of classifying image files into albums.

Advantageous Effects of Invention

For efficient management of photograph data, applications executable in smart devices can be developed and used. Photograph data that is taken by a user is accessible (under the user's permission) through application programming interfaces (APIs) of operating systems (OS) for smart devices such as Android and iOS and is applicable to a program and an application for efficient management of photographs by using the permission.

A function of management of distributed photographs can be distributed in a software development kit (SDK) form capable of being conveniently used in applications such as Android/iOS applications, and thus, the utilization of the function can be mutually discussed.

According to the characteristics of the current smart device market, the method of the present invention targets not only domestic users but also users all over the world and is particularly related to the camera and photograph function which is one of the key functions of smart devices. Therefore, the applicability of the invention is significant.

The method of the present invention is applicable to various types of devices in association with Google PlayStore, Apple's AppStore, etc. or by uploading the application thereto.

When a solution based on the technology of the present invention is developed in the SDK form, it is possible to facilitate business alliances and the like with photograph storage and management service providers.

Alliances with global companies specialized in photography, such as Apple's iPhoto, Google's Google Photos, Samsung's cloud photo, and Dropbox, can further enhance the utilization of photograph management.

REFERENCE SIGN LIST

301: internal storage space

BEST MODE FOR CARRYING OUT THE INVENTION

Figure 1:
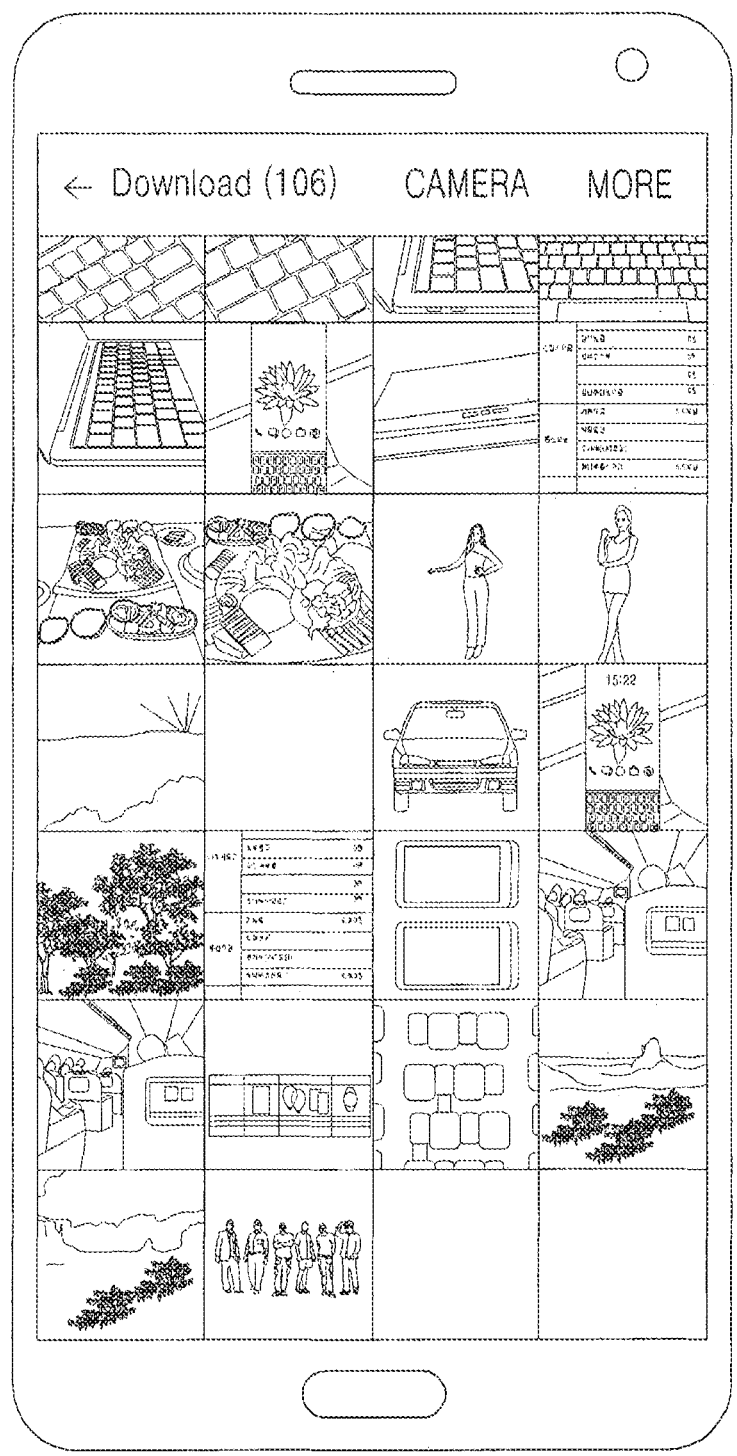
FIGS. 1 to 4 are diagrams illustrating a method of designating a photograph album in a smartphone according to the related art.

According to the present invention, there is provided a method of classifying, into an album, one or more image files stored in a terminal with a screen to which a touch screen is applied, the method including (1) a step of confirming album/folder information included in the terminal; (2) a step of displaying an image file stored in the terminal on the screen of the terminal; (3) a step of determining whether a predetermined specific gesture is input with respect to the image file; (4) when the specific gesture is input, a step of determining whether the album/folder information is stored; (5) when it is determined in step (4) that the album/folder information is not stored, a step of recommending album/folder information; (6) a step of displaying both or one of the album/folder information recommended in step (5) and the stored album/folder information on the screen of the terminal; (7) a step of determining to which album/folder information a drag is made among the album/folder information displayed on the screen of the terminal; and (8) a step of moving the image file to an album/folder corresponding to the album/folder information to which the drag has been made.

Step (1) may include identifying a folder including image files among folders included in a storage of the terminal as an album, and storing a name of the album as the album/folder information.

In step (3), the specific gesture may include touching and holding the screen for a long time.

Step (8) may include tagging the image file with a phrase corresponding to the album/folder information, together with the movement of the image file.

The recommendation of the album/folder information in step (5) may include recommending information received from an external server connected to the terminal via wire or wirelessly, and album/folder information related to the image file may be recommended from the external server through machine learning.

The information received from the external server may include one of: information obtained by conducting image recognition on the image file; and information regarding a location identified by conducting GPS recognition on the image file.

The recommendation of the album/folder information in step (5) may include recommending one of: information obtained by conducting image recognition on the image file in the terminal; and information regarding a location identified by conducting GPS recognition on the image file in the smart device.

Step (1) may be performed between steps (2) and (3) or between steps (3) and (4).

When a plurality of pieces of album/folder information are displayed in step (6), the plurality of pieces of album/folder information may be arranged around the point on the screen where the user is touching.

When the plurality of pieces of album/folder information are n pieces of information, the n pieces of information may be arranged radially around the point on the screen where the user is touching to be spaced from each other at an angle of 360/n degrees.

When the number of the plurality of pieces of album/folder information exceeds a certain number, the plurality of pieces of album/folder information may be displayed in two or more virtual concentric circles.

Previously stored album/folder information confirmed in step (1) among the plurality of pieces of album/folder information may be displayed in an inner first concentric circle, and the album/folder information recommended in step (5) among the plurality of pieces of album/folder information may be displayed in the inner first concentric circle when there is a free space in the first concentric circle and may be displayed in a concentric circle outside the first concentric circle when there is no free space in the first concentric circle.

Previously stored album/folder information confirmed in step (1) and the album/folder information recommended in step (5) among the plurality of pieces of album/folder information may be displayed in different forms to be visually distinguished from each other.

Previously stored album/folder information confirmed in step (1) and the album/folder information recommended in step (5) among the plurality of pieces of album/folder information may be displayed with a time difference.

According to the present invention, there is provided a computer-readable recording medium having recorded thereon either a program or an application for smart devices for executing the above-described method of classifying image files into albums in the terminal.

According to the present invention, there is provided a terminal with a screen to which a touch screen is applied, the terminal configured to be used to implement the above-described method of classifying image files into albums.

EMBODIMENTS

Hereinafter, a system and a method according to the present invention will be described with reference to the accompanying drawings.

FIGS. 1 to 4 are diagrams illustrating a method of designating a photograph album in a smartphone according to the related art.

Smartphones, smart pads, and other smart devices today have a camera function, and photographs that are taken using the camera function of each device are stored in a specific folder of an internal storage of the device. For example, as illustrated in FIG. 1, photographs which are taken (or downloaded) are stored in a specific folder.

Although the terms "folder" and "album" have similar concepts, when image files are stored in a folder, the folder may be identified as an album. A folder name and an album name may be the same. In a special case, a name of an album corresponding to a folder may be set to be different from that of the folder, but generally, the terms "folder name" and "album name" are used interchangeably.

Figure 2:
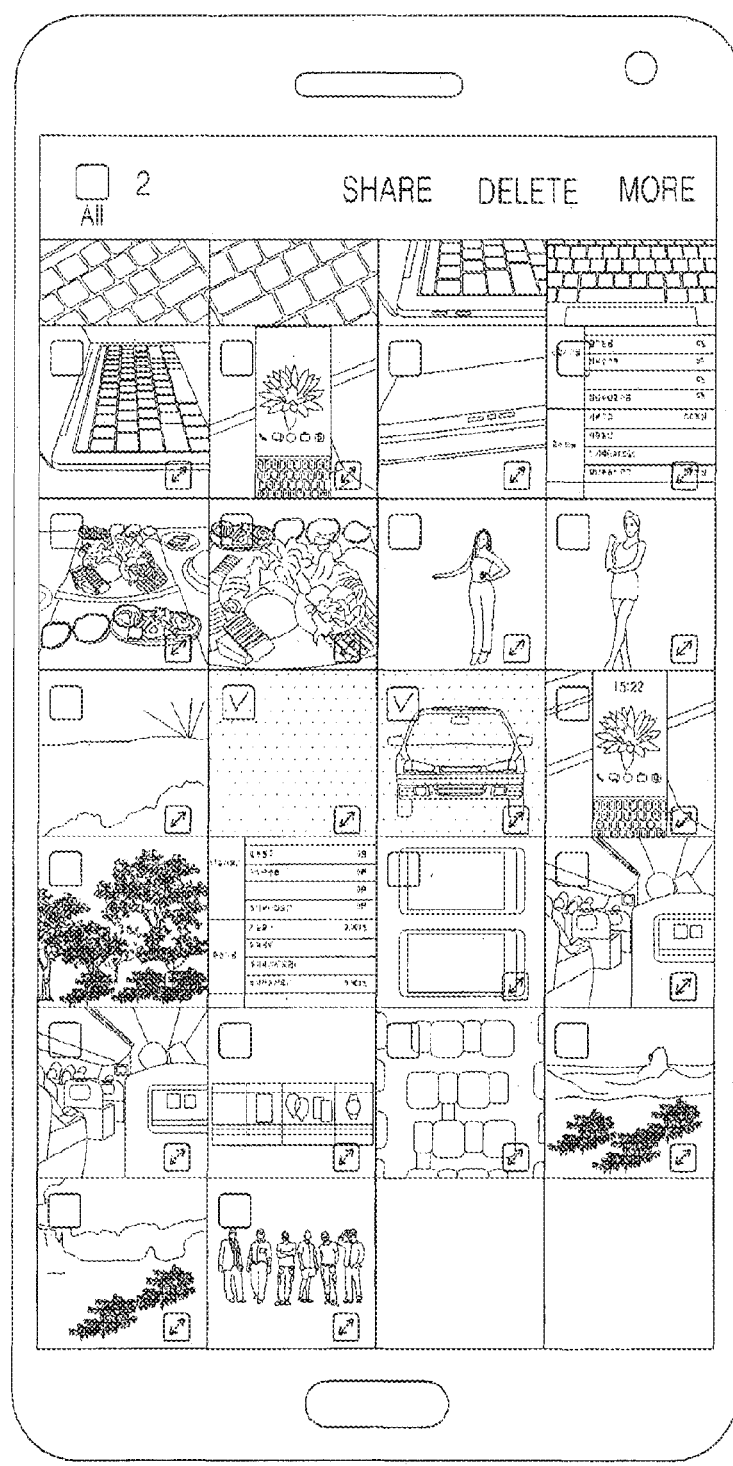

Referring to FIG. 2, two photographs of cars illustrated in the middle of the drawing are ticked. This means that the photographs are touched and selected.

After the two photographs in a folder are selected, a "MORE" button at the top of the drawing is pressed.

Figure 3:
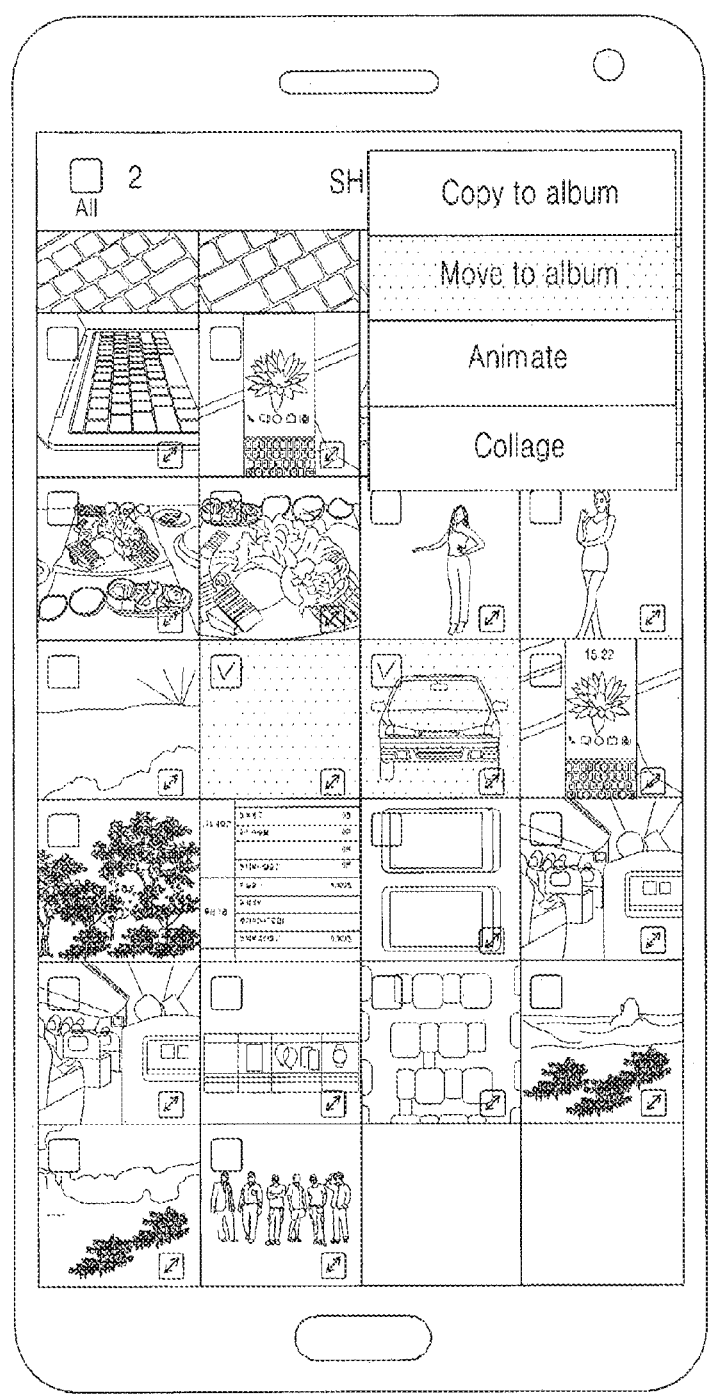

Then, as illustrated in FIG. 3, a submenu corresponding to the "MORE" button is displayed and thus, it is possible to select an operation such as copying photographs to a specific album (folder) (that is, "Copy to album") or moving the photographs to a specific album (folder).

Figure 4:
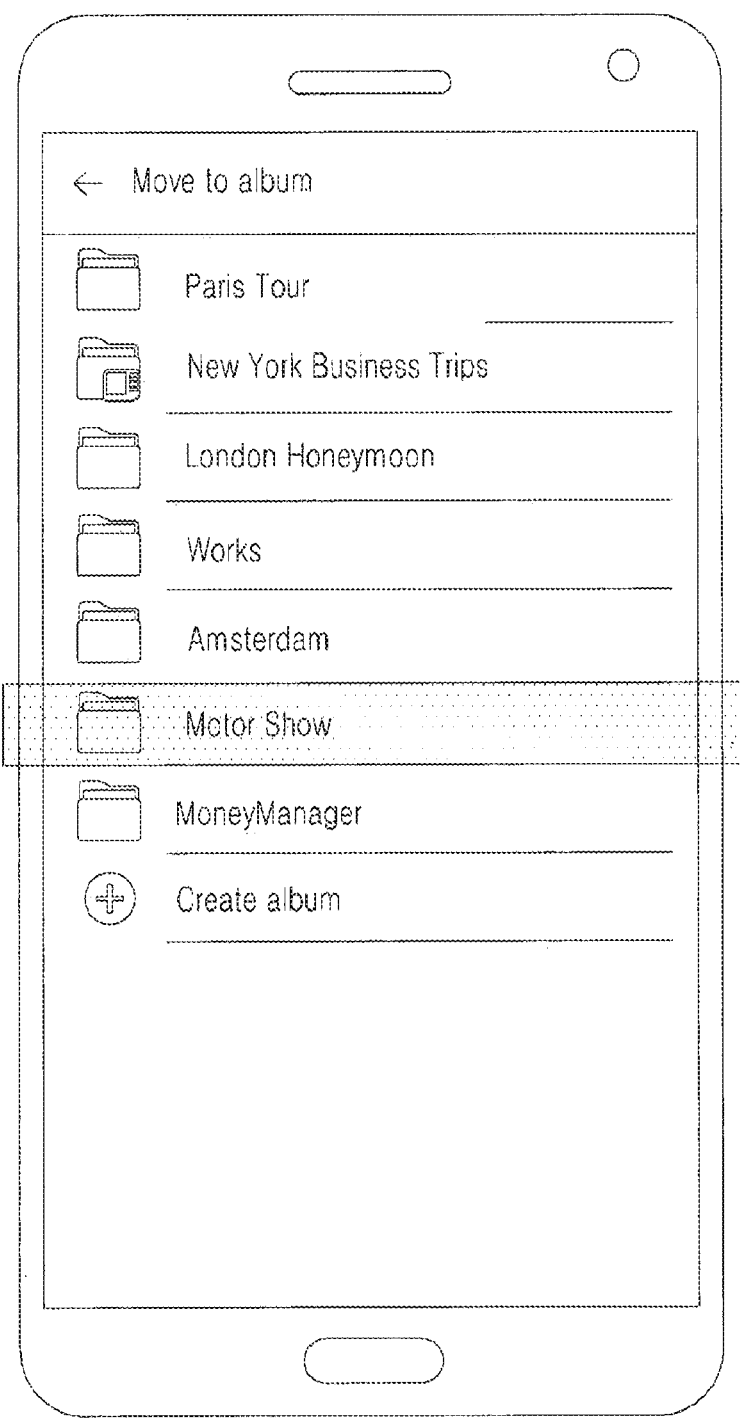

When a user selects "Move to album", albums (i.e., folders having photographs stored therein) included in the device are displayed as illustrated in FIG. 4. In FIG. 4, names of target folders to which the selected photographs can be moved are listed as "Paris Tour", "New York Business Trips", "London Honeymoon", "Works", "Amsterdam", "Motor Show", "MoneyManager". The user can touch a specific folder among the folders to move the photographs to the touched folder. Alternatively, referring to FIG. 4, in order to create a new folder other than the listed folders and move the two selected photographs thereto, the user selects "Create album" and inputs a folder name. Accordingly, a new folder is created and the selected two photographs are moved to the new folder.

In the embodiment illustrated in FIGS. 1 to 4, the selected two photographs of cars are moved to the "Motor Show" folder which is selected in FIG. 4.

In summary, the above-described method of the related art is a method of designating a photograph album in a smartphone by selecting photographs and pressing the "MORE" button at the top of the drawing to move or copy the photographs to an album, and using 'Move after select' as a basic User eXperience (UX) in the same manner as a GUI method using a mouse. That is, this method is a method of directly creating and selecting an album/folder. This method is considered inconvenient to be used in current touch-based smart devices and current smart devices with a large screen.

First Embodiment

FIGS. 5 to 8 are diagrams illustrating a first embodiment of the present invention.

Figure 5:
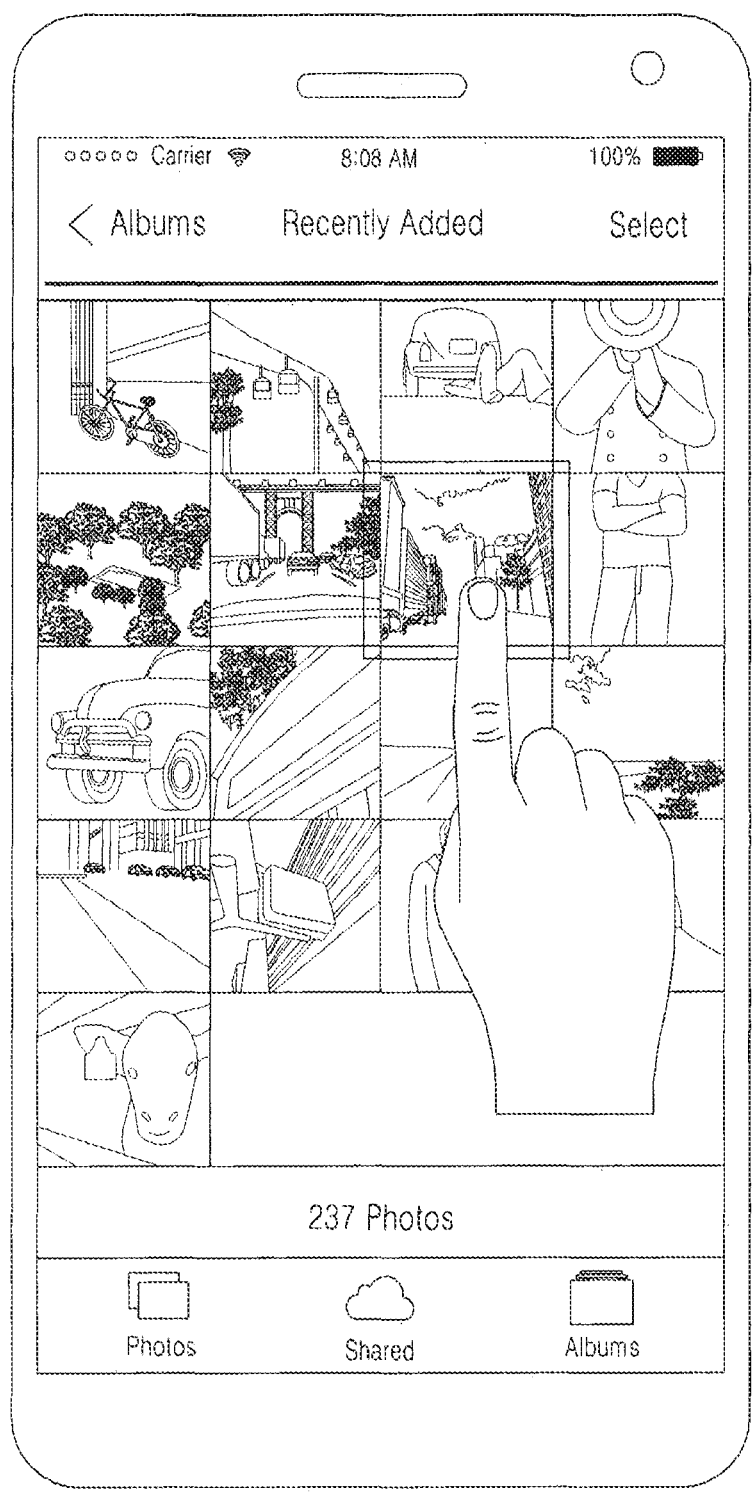
FIGS. 5 to 8 are diagrams illustrating a first embodiment of the present invention.

FIG. 5 illustrates an example in which a plurality of photographs are displayed. Generally, photographs included in one folder (e.g., a folder among a camera folder, a download folder, and a specially designated folder) may be presented. However, it may be set to display all photographs which are included in two or more folders and which have yet to be specifically categorized (for example, all the photographs included in the camera folder and the download folder are displayed together), if necessary.

Among the presented photographs, a user designates (for example, touches) a photograph to be categorized. Then the designated photograph is displayed in a larger size as illustrated in FIG. 6.

Figure 6:
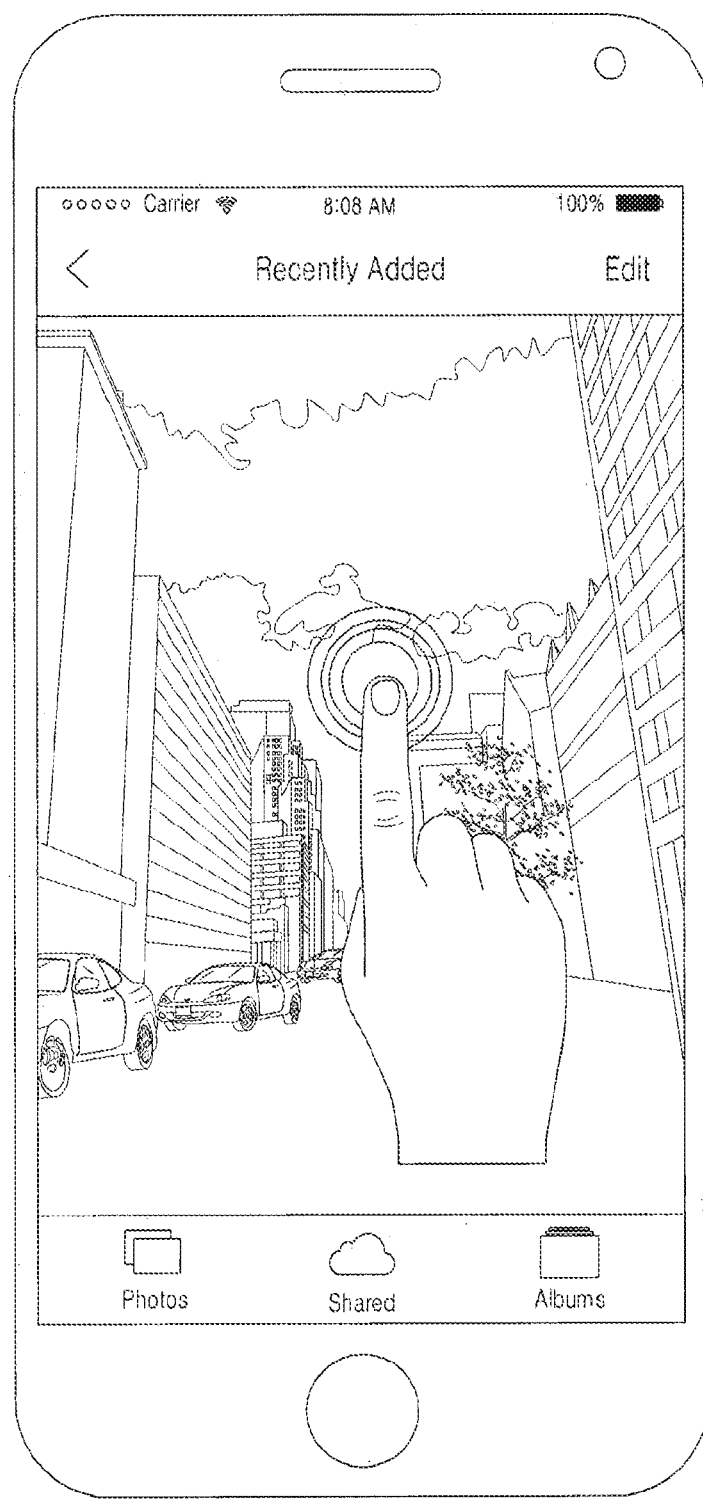
Figure 7:
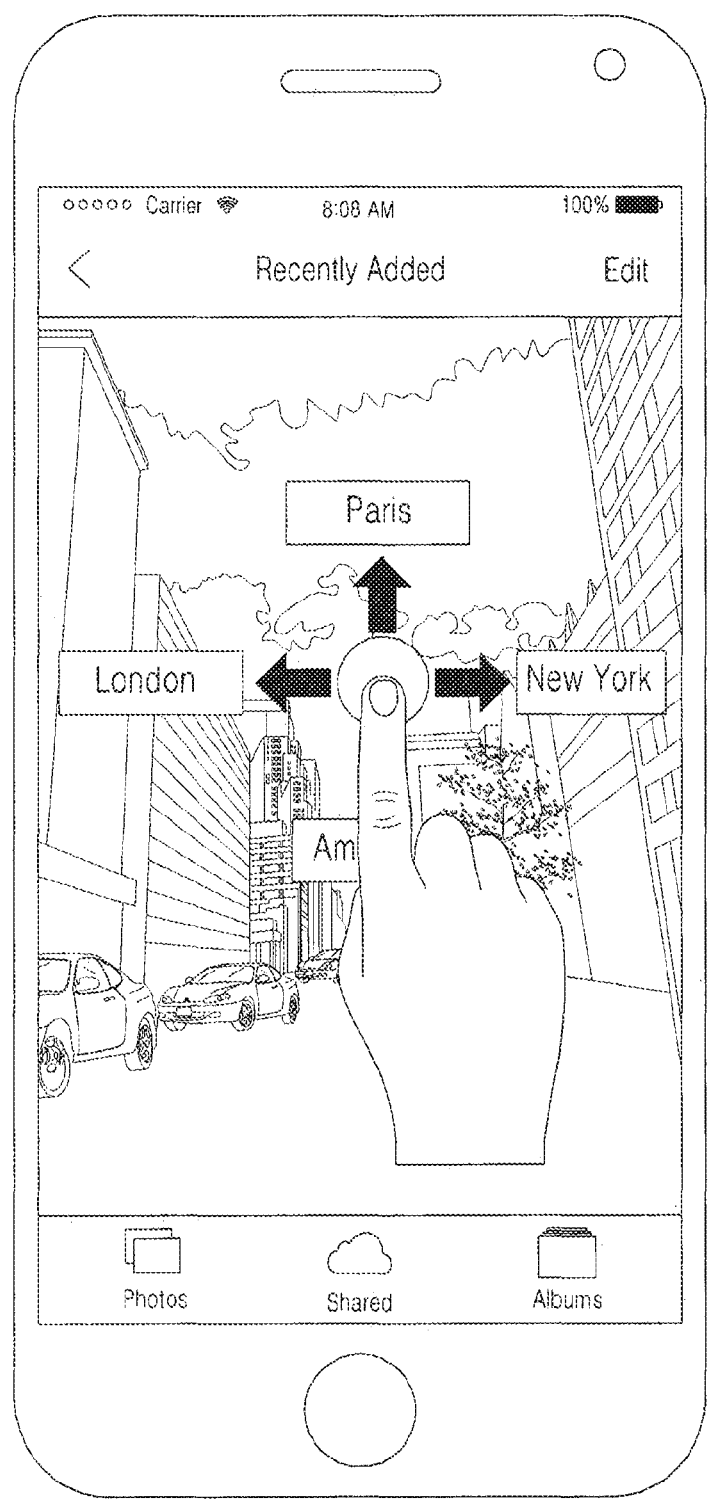

Although various functions may be performed on the screen of FIG. 6, in relation to the present invention, a function according to the present invention is executed to switch the screen of FIG. 6 to a screen of FIG. 7 when a predetermined specific gesture is input. For example, the screen of FIG. 6 may be switched to the screen of FIG. 7 by touching and holding a photograph on the screen of FIG. 6 for a long time (e.g., for one second or more) or by touching the photograph on the screen of FIG. 6 three times. That is, an example of the predetermined specific gesture may include touching and holding the photograph for a long time or touching the photograph several times. Any other gestures that are not against or do not conflict with other actions conducted on the smart device may be set to the predetermined specific gesture.

A specific gesture is described to be performed when the photograph is displayed on the entire screen as illustrated in FIG. 6. As a modified example, it may be set to switch from the screen of FIG. 5 directly to the screen of FIG. 7 when the specific gesture is performed with respect to a specific photo, for example, on a screen such as the screen of FIG. 5 (i.e., a screen displaying a plurality of photographs). In this case, some inconvenience (identifying small-sized photographs, and/or modifying basic parts of a user interface) may be caused. For reference, for convenience of explanation, a 'photograph' is described in the present invention but is not limited thereto. A picture or any image file may be used. However, a photograph file is considered to have the greatest utility, considering the convenience of classification.

As a basic embodiment, a specific gesture is assumed to be performed on the screen of FIG. 6 to switch to the screen of FIG. 7. With respect to the touched point on the screen of FIG. 7, "Paris" is displayed above, "Amsterdam" is displayed below, "New York" is displayed on the right, and "London" is displayed on the left Fig. They are included in a list of target folders to which the photograph currently displayed on the screen can be moved.

"Paris", "Amsterdam", "New York", and "London" illustrated in an example of FIG. 7 are either album/folder names that already exist in a storage of the smart device or recommended album/folder names. Whether they are the already existing album/folder names or the recommended album/folder names will be described with reference to FIG. 9 below.

Figure 8:
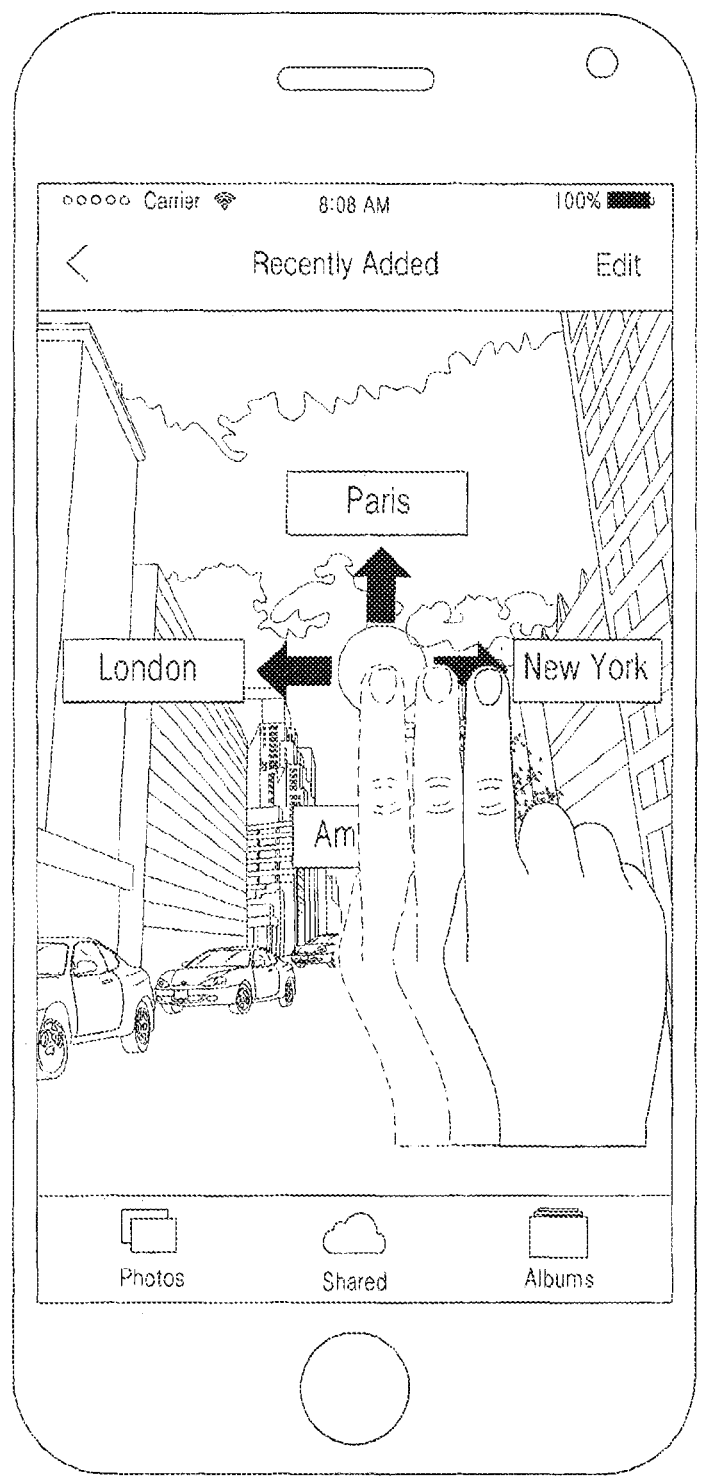

When a user's finger touching the point on the screen of FIG. 7 is moved directly to the right, a situation illustrated in FIG. 8 occurs. In this case, the photograph currently displayed on the screen is stored in the "New York" album.

To summarize briefly, FIGS. 5 to 8 illustrate the utilization of the present invention in a user's point of view.

FIG. 5 illustrates viewing captured photographs.

FIG. 6 illustrates that a predetermined specific gesture (e.g., a long touch (touching and holding (long-pressing)) is input to move the photograph that is being viewed to an album or a folder.

FIG. 7 illustrates that folder/album information previously stored or information recommended via an external server (which will be described below with reference to FIG. 10) is retrieved and displayed to a user.

FIG. 8 illustrates setting a folder/album/tagging to a desired folder name by the user's gesture (dragging).

Figure 9:
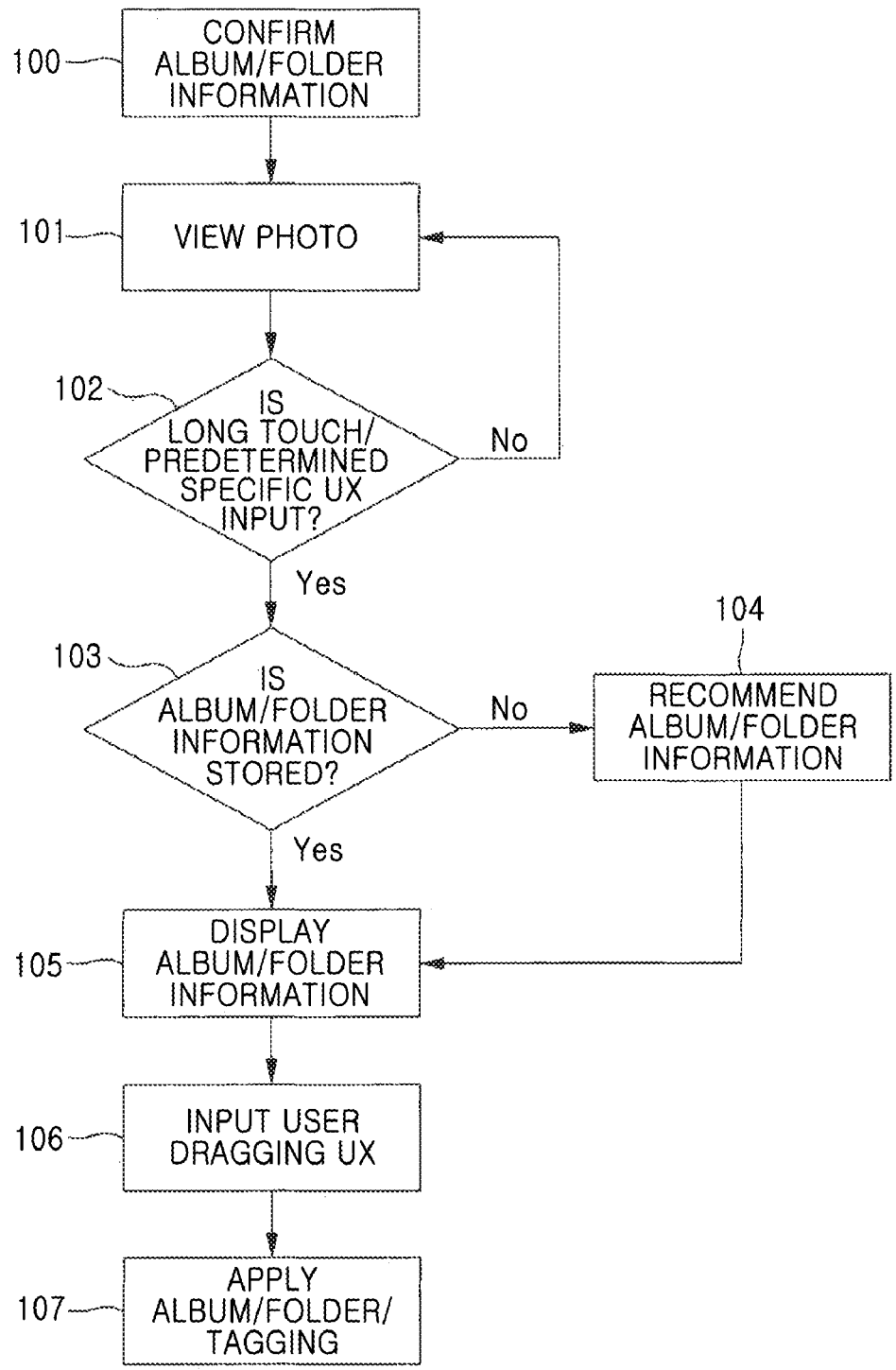
FIG. 9 is a flowchart of the first embodiment.

FIG. 9 is a flowchart of the first embodiment.

Although the first embodiment of the present invention has been described with reference to FIGS. 5 to 8 in the above, hereafter, the first embodiment will be described from a different point of view using a flowchart.

In step 100, a device (e.g., a smart device with a touch screen, such as a smartphone or a smart pad) confirms album/folder information included in a storage thereof. The storage of the device may include a memory embedded in the device, a card type memory inserted into the device, and the like. In other words, in step 100, previously stored album information and folder information are identified.

That is, matters, such as a folder in which photographs are stored, the name of the folder (album name), etc., are identified in advance.

In step 101, 'view photo' is conducted. When 'view photo' is conducted, a photograph is selected from among photographs in a screen such as that of FIG. 5 (a plurality of photographs in one folder, non-categorized photographs in a plurality of folders depending on settings, or all photographs in the storage depending on settings) to be displayed in a screen such as that of FIG. 6.

In step 102, predetermined specific UX such as a long touch (touching and holding; i.e., touching and holding the photograph for a long time) is input. The process proceeds to step 103 when such an input is received, and the screen showing the photograph in step 101 is retained when such an input is not received. In other words, step 102 may be considered as a step to determine whether the input gesture is a predetermined and appointed gesture when a specific gesture (e.g., touching and holding (long-pressing)) is input on the photograph.

In step 103, whether the album/folder information is stored is determined. That is, whether the album/folder information confirmed in step 100 is smoothly stored is determined. When a photograph file is included in a folder, the folder may be handled as an album. In this case, the name of the album is generally the same as that of the folder but the name of the album corresponding to the folder may be set to be different from that of the folder, if necessary.

When it is determined to be 'Yes' in step 103, the process proceeds to step 105 and the album/folder information is displayed. That is, when there are previously stored "Paris", "London", "New York", and "Amsterdam" albums, the screen will be displayed as illustrated in FIG. 7.

However, in step 103, it may be determined to be 'No'. That is, there may not be any other albums (i.e., folders including a photograph file) except for a folder (album) in which the selected photograph is currently present. In this case, the process proceeds to step 104 and album/folder names are recommended. The recommendation of the album/folder names in step 104 may be performed using another user's data analysis server. The recommendation of the album/folder names will be described below with reference to FIG. 10.

FIG. 9 illustrates a case in which the process proceeds to step 105 when 'Yes' in step 103 and the process proceeds to step 104 when 'No' in step 103. However, the previously stored folder/album names and the recommended album names may be simultaneously displayed on the screen, when 'Yes' in step 103.

In step 105, the previously stored folder/album names or the recommended folder/album names according to step 103 or 104 are displayed on the screen. That is, as illustrated in FIG. 7, the folder/album names are listed radially around the touched point on the screen. In the example of FIG. 7, four folder/album names are presented to be arranged at an angle of 90 degrees (360/4 degrees) with each other. When n folder/album names are presented, the folder/album names may be arranged at an angle of 360/n degrees with each other. However, such an arrangement of the folder/album names are an example, and the folder/album names may be arranged to be spaced from each other at an arbitrary angle. On the other hand, a plurality of folder/album names may be arranged in a different form (for example, a method which will be described with reference to FIG. 11 below).

In step 106, in order to put the photograph into the "New York" folder in a circumstance as illustrated in FIG. 7, the finger is moved to the right in a state of touching the photograph (i.e., dragging is performed).

In step 107, the photograph is moved to the designated album/folder by the user's dragging UX input described above.

In this case, it is possible to not only move the photograph but also tag the photograph together with the movement of the photograph. That is, a "New York" tag can be added to the photograph while the photograph is moved to the "New York" folder. An album/folder name and a tag do not necessarily match but may have a predetermined correlation. For example, the album/folder name may be "New York" and the tag may be "New York photo".

Although step 100 is illustrated before step 101 in FIG. 9, step 100 may be performed after step 101 or 102 as long as step 100 is performed before step 103. However, in order to smoothly display the album/folder names on a display without a delay of time, an order illustrated in FIG. 9 will be preferable.

Figure 10:
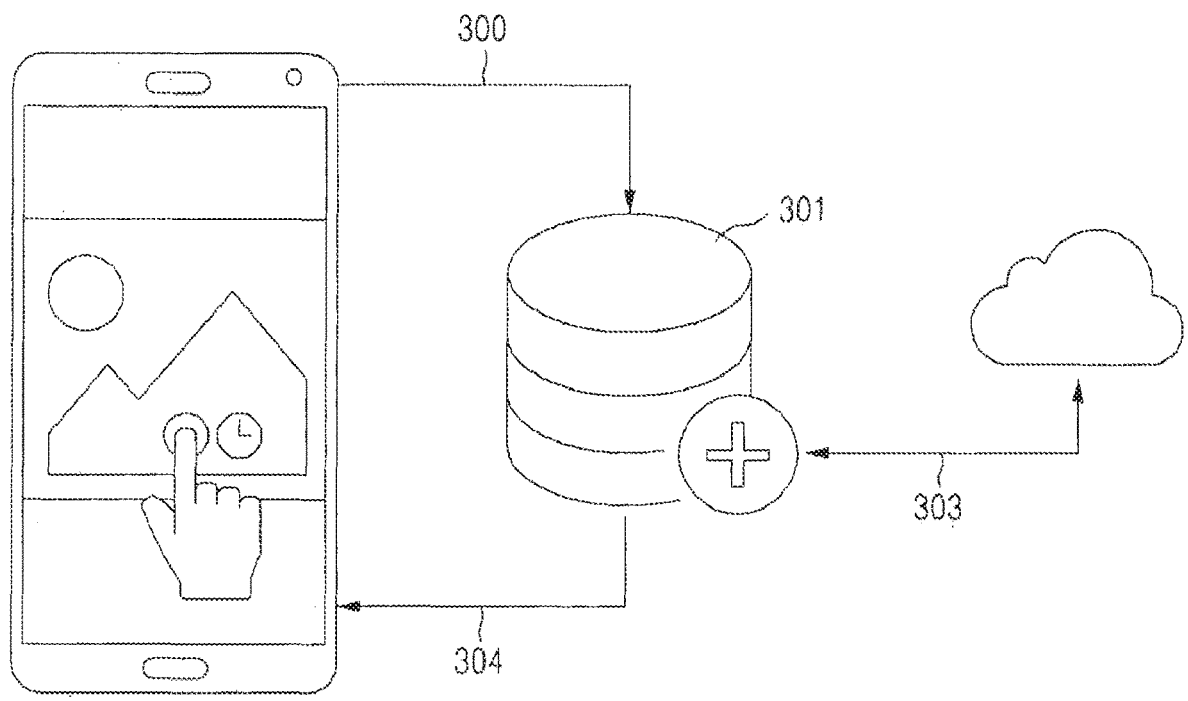
FIG. 10 is a diagram illustrating a method of recommending an album/folder name in step 104 of FIG. 9.

FIG. 10 is a diagram illustrating a method of recommending an album/folder name in step 104 of FIG. 9.

The method relates to the folder names illustrated in FIG. 7, and album/folder names are recommended when there is no previously stored album. Alternatively, even when there are previously stored albums, not only the previously stored albums but also recommended album/folder names can be displayed on the display.

In FIG. 10, when a user inputs a specific gesture (for example, touching and holding (long-pressing)) with respect to a photograph, the smart device accesses to the internal storage space 301 to identify album information (step 300). In FIG. 10, a clock symbol displayed on the right side of a finger touching the screen may be used as an indication that the method of the present invention is being implemented. That is, if the specific gesture for implementing the present invention is touching and holding (long-pressing), the clock symbol may be displayed and the present invention may be implemented when touching is performed for a predetermined time or longer. Alternatively, the clock symbol may be displayed at the moment when the touching is performed, and the present invention may be implemented after a certain period of time while the clock symbol is changed.

Thereafter, a recommendable machine-learning-based external server is connected to recommend appropriate information, and the appropriate information is stored in the internal storage space 301 (step 303). Thus, internally stored album information and recommended album information learned from the outside are transmitted to the smart device to be used in the smart device (step 304).

Second Embodiment

Figure 11:
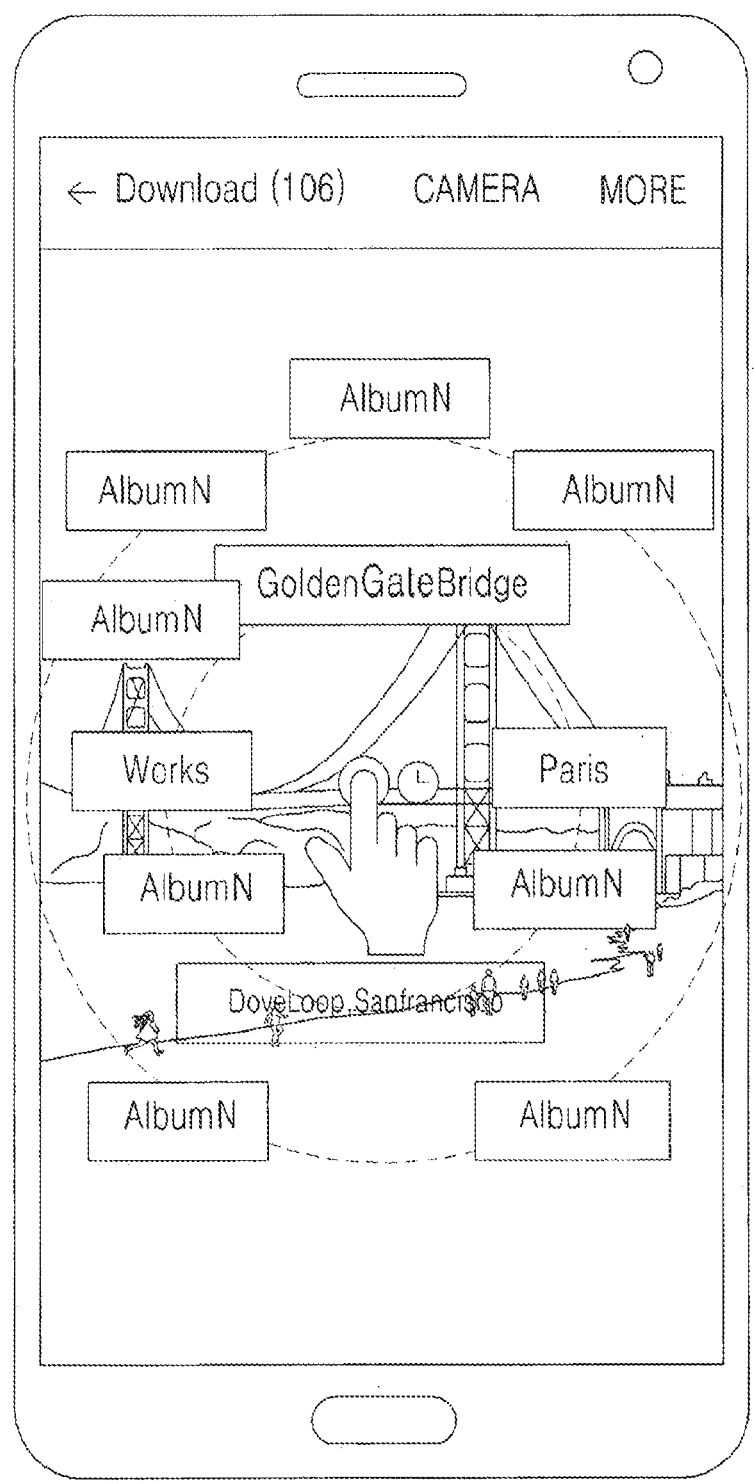
FIG. 11 is a diagram illustrating a second embodiment of the present invention.

FIG. 11 is a diagram illustrating a second embodiment of the present invention.

The second embodiment is similar to the first embodiment of the present invention but is useful when there are many folder names (album names) to be displayed in the circumstance as illustrated in FIG. 7.

Only four album names are displayed in FIG. 7 of the first embodiment. There may be no problem with displaying the album names when the number of the album names is about four. However, if there are many album names (for example, ten or more album names) to be displayed, when the album names are displayed as illustrated in FIG. 7, there is a high possibility that a user feels inconvenience.

Therefore, according to the second embodiment of the present invention, when the number of folders (albums) is large, the names of the folders can be displayed in a circular shape based on the importance and a degree of recommendability thereof as illustrated in FIG. 11.

For example, folder names stored in the internal storage, which are imported without an additional task, can be immediately suggested in an inner circle of FIG. 11. The inner circle and an outer circle are indicated by dotted lines for convenience of explanation.

In the case of recommended folder names which require separate processing or networking, it may be difficult to display the folder names at an early stage within a short time period.

In this case, recommended folder names may be displayed in the circular shape with a time difference. The folder names may be displayed in the inner circle, and may be displayed in the outer circle when the number of folder names displayed in the inner circle is equal to or greater than a certain number (seven in FIG. 11).

For example, the previously stored album/folder information confirmed in step 100 of FIG. 9 among the plurality of pieces of album/folder information may be displayed in an inner first concentric circle, and the album/folder information recommended in step 104 of FIG. 9 among the plurality of pieces of album/folder information may be displayed in the first concentric circle when there is a free space in the first concentric circle and may be displayed in a concentric circle outside the first concentric circle when there is no free space in the first concentric circle.

Although the two circles are illustrated, three or more circles may be used when the size of a screen is sufficiently large. However, it is desirable to consider that a user may feel difficult to confirm when an extremely large number of circles (virtual multiple circles) are used. The number of circles may be determined by sensing the resolution of the smart device.

Third Embodiment

Figure 12:
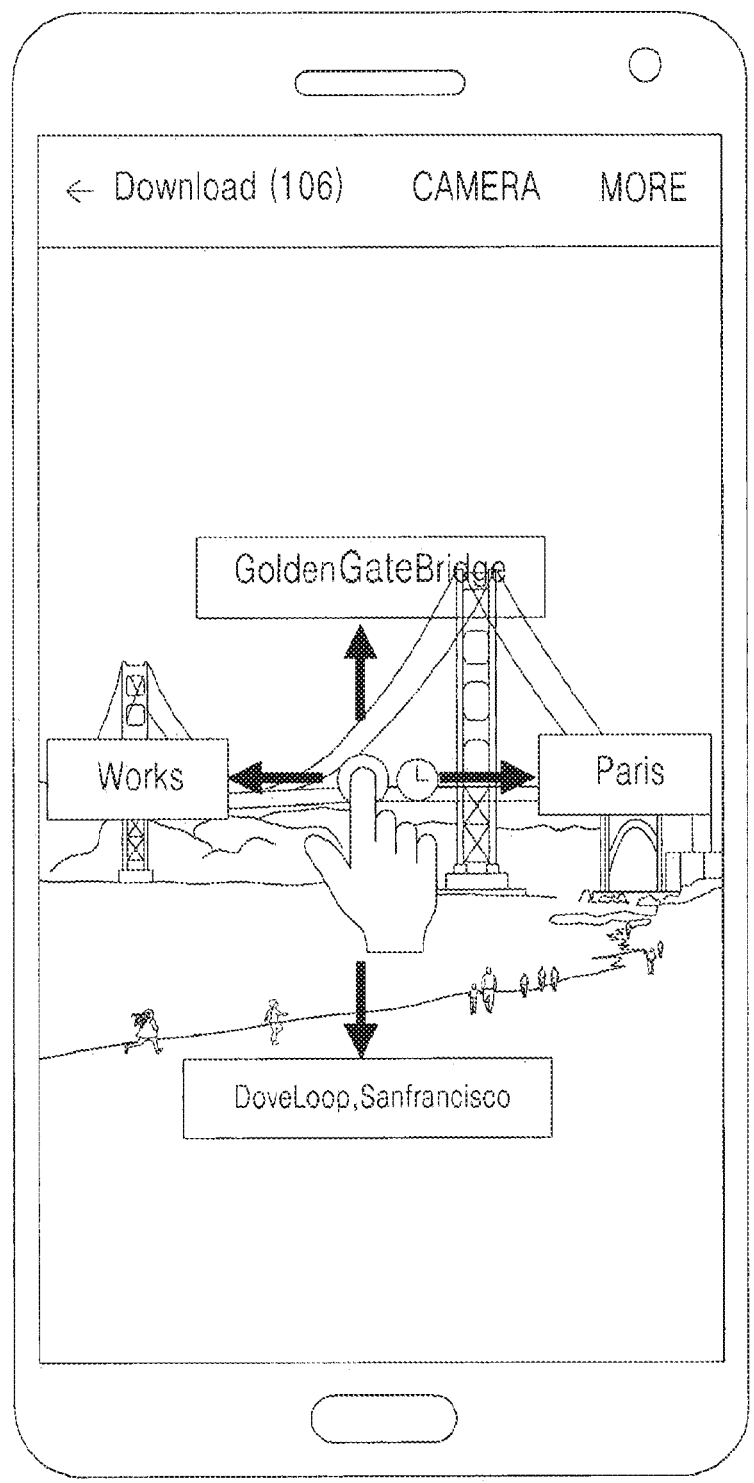
FIG. 12 is a diagram illustrating a third embodiment of the present invention.

FIG. 12 is a diagram illustrating a third embodiment of the present invention.

In an example of a screen of a smartphone of FIG. 12, "Works" and "Paris", and "Golden Gate Bridge" and "DoveLoop, San Francisco" are displayed in different forms. That is, the names are visually distinguished from each other.

In the above example, "Works" and "Paris" are the names of albums that exist in an internal storage of the smart device, and "Golden Gate Bridge" and "DoveLoop, San Francisco" are album names that do not exist in the internal storage and are recommended according to the present invention.

"Golden Gate Bridge" is an album name recommended through image recognition, and "DoveLoop, San Francisco" is an album name recommended through GPS information. Recommended album names such as "Golden Gate Bridge" and "DoveLoop, San Francisco" may be obtained by performing step 303 of FIG. 10.

Image recognition may be conducted in a smart device. However, since the amount of base data is likely to be extremely small in a smart device, it is preferable that image recognition is conducted through machine learning by connecting to an external server in many cases.

Similarly, GPS location recognition may be conducted in a smart device when location data by GPS is stored in the smart device. However, since the amount of location data is likely to be extremely small in a smart device, it is preferable that GPS location recognition is conducted through machine learning by connecting to an external server in many cases.

Figure 13:
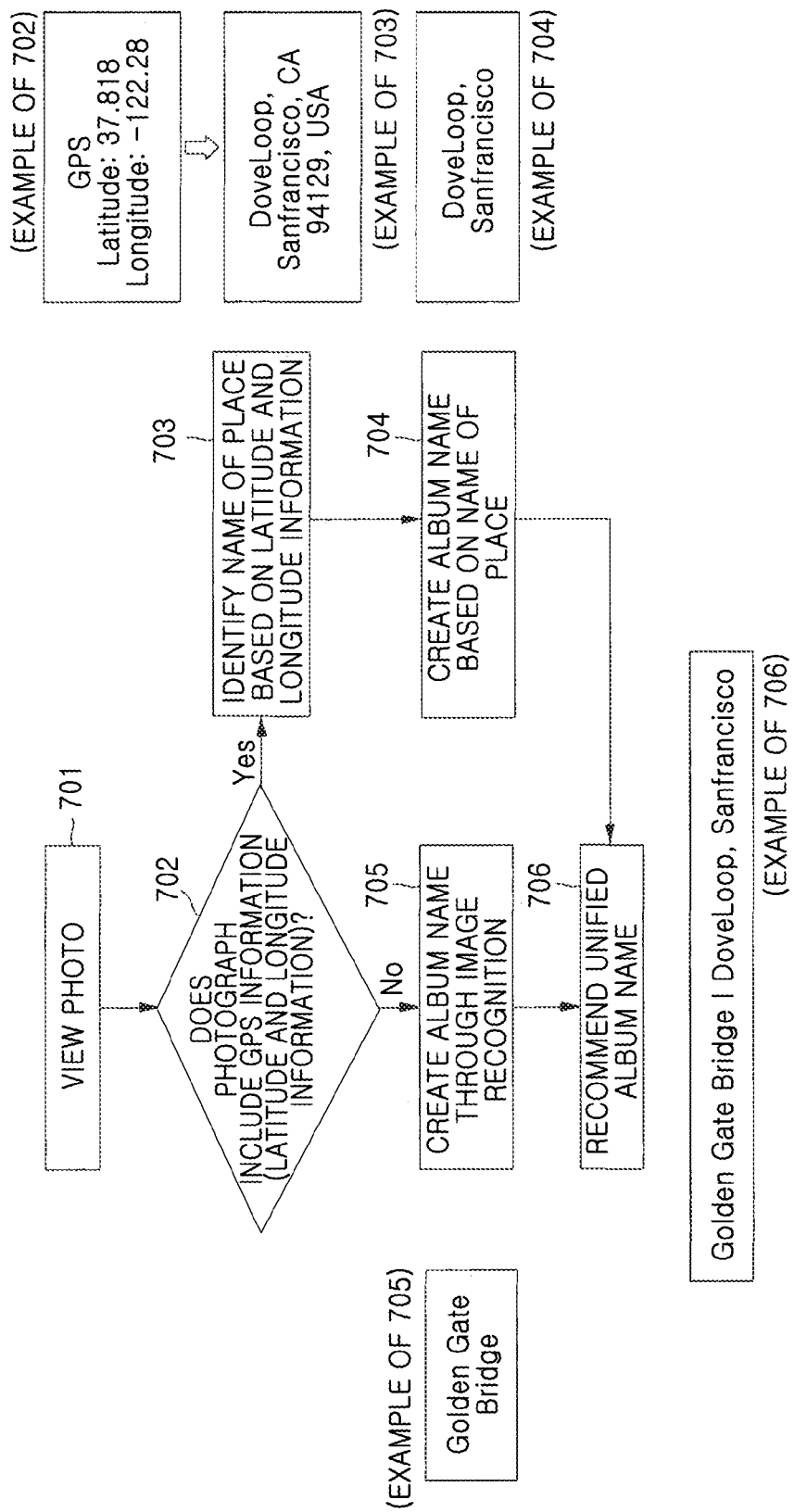
FIG. 13 is a flowchart illustrating a process of obtaining album names of FIG. 12.

FIG. 13 is a flowchart of a process of obtaining album names of FIG. 12.

In step 701, when 'view photo' is conducted, a photograph as illustrated in FIG. 12 are displayed on the screen.

In step 702, whether a photograph includes GPS information (latitude and longitude information) is determined. The photograph presented as an example is confirmed to include information such as latitude of 37.818 and longitude of −122.28.

When it is determined that GPS information is included, the process proceeds to step 703 from step 702. In step 703, the name of the place is identified based on the latitude and longitude information. The location of the place was identified as DoveLoop, San Francisco, Calif. 94129, USA. In step 704, an appropriate place name at the location is selected or chosen. In this example, DoveLoop, San Francisco is determined as an appropriate place name.

On the other hand, when it is determined that GPS information is not included, the process proceeds to step 705 from step 702. In step 705, an album name is created through image recognition. As a result of image recognition, the photograph is identified as Golden Gate Bridge. The album name may be searched for by a technique, for example, machine learning or the like.

In step 706, a unified album name is recommended. An album name 'DoveLoop, San Francisco' based on the name of the place was obtained from GPS information, and an album name 'Golden Gate Bridge' was obtained through image recognition. The above two album names are displayed as recommended album names as illustrated in FIG. 12. Step 702 branches to 'Yes' and 'No', but the present invention is not limited thereto and both steps 703 and 705 may be performed when there is GPS information. In this case, a result illustrated in FIG. 12 can be obtained by performing both steps 703 and 705.

On the other hand, in an example of FIG. 12, "DoveLoop, San Francisco" and "Golden Gate Bridge" are separately suggested as recommended album names, whereas in a modified example, an album name such as "Golden Gate Bridge, DoveLoop, San Francisco" may be recommended. However, in this case, the inconvenience may be caused due to a long album name. Therefore, the number of characters may be limited, and the result of image recognition and the name of the place may be combined and additionally recommended as one album name when the number of characters is equal to or less than a certain number and may not be recommended when the number of characters is greater than the certain number.

Although the present invention has been described above with respect to an album name (folder name), a name that is the same as the album name (or a name that is slightly modified if necessary) may be added as a tag to the photo.

While the present invention has been described above with respect to specific examples, the present invention is not limited to the embodiments set forth herein, and various modifications can be made by those skilled in the art within the basic scope of the present invention defined in the appended claims. It should be understood that other modifications not departing from the basic idea of the present invention also fall within the scope of the present invention.

INDUSTRIAL APPLICABILITY

The present invention relates to a method of designating and tagging an album or a folder for photographs stored in a touch screen terminal such as a smartphone, and a computer-readable recording medium and a terminal therefor.

SEQUENCE LIST (None)

The invention claimed is:

1. A method of classifying, into an album, one or more image files stored in a terminal with a screen to which a touch screen is applied, the method comprising:
(1) a step of checking album/folder information included in the terminal;
(2) a step of displaying an image file stored in the terminal on the screen of the terminal;
(3) a step of determining whether a predetermined specific gesture is input with respect to the image file;
(4) a step of determining whether the album/folder information is stored when the specific gesture is input;
(5) a step of recommending album/folder information when it is determined in the step (4) that the album/folder information is not stored;
(6) a step of displaying both or one of the album/folder information recommended in the step (5) and the stored album/folder information on the screen of the terminal;
(7) a step of determining to which album/folder information a drag is made among the album/folder information displayed on the screen of the terminal; and
(8) a step of moving the image file to an album/folder corresponding to the album/folder information to which the drag has been made.

2. The method according to claim 1, wherein
the step (1) includes identifying a folder including image files among folders included in a storage of the terminal as an album, and storing a name of the album as the album/folder information.

3. The method according to claim 1, wherein
in the step (3), the specific gesture includes touching and holding the screen for a long time.

4. The method according to claim 1, wherein
the step (8) includes tagging the image file with a phrase corresponding to the album/folder information, together with the movement of the image file.

5. The method according to claim 1, wherein
the recommendation of the album/folder information in the step (5) includes recommending information received from an external server connected to the terminal via wire or wirelessly, and
album/folder information related to the image file is recommended from the external server through machine learning.

6. The method according to claim 5, wherein
the information received from the external server includes one of:
information obtained by conducting image recognition on the image file; and
information regarding a location identified by conducting GPS recognition on the image file.

7. The method according to claim 1, wherein
the recommendation of the album/folder information in the step (5) includes recommending one of:
information obtained by conducting image recognition on the image file in the terminal; and
information regarding a location identified by conducting GPS recognition on the image file in a smart device.

8. The method according to claim 1, wherein
the step (1) is performed between the steps (2) and (3) or between the steps (3) and (4).

9. The method according to claim 1, wherein
when a plurality of pieces of album/folder information are displayed in the step (6), the plurality of pieces of album/folder information are arranged around the point on the screen where a user is touching.

10. The method according to claim 9, wherein
when the plurality of pieces of album/folder information are n pieces of information, the n pieces of information are arranged radially around the point on the screen where the user is touching to be spaced from each other at an angle of 360/n degrees.

11. The method according to claim 9, wherein
when the number of the plurality of pieces of album/folder information exceeds a certain number, the plurality of pieces of album/folder information are displayed in two or more virtual concentric circles.

12. The method according to claim 11, wherein
previously stored album/folder information confirmed in the step (1) among the plurality of pieces of album/folder information is displayed in an inner first concentric circle, and
the album/folder information recommended in the step (5) among the plurality of pieces of album/folder information is displayed in the inner first concentric circle when there is a free space in the first concentric circle, and is displayed in a concentric circle outside the first concentric circle when there is no free space in the first concentric circle.

13. The method according to claim 11, wherein
previously stored album/folder information confirmed in the step (1) and the album/folder information recommended in the step (5) among the plurality of pieces of album/folder information is displayed in different forms to be visually distinguished from each other.

14. The method according to claim 11, wherein
previously stored album/folder information confirmed in the step (1) and the album/folder information recommended in the step (5) among the plurality of pieces of album/folder information is displayed with a time difference.

15. A non-transitory computer-readable recording medium on which a program or an application for smart devices is recorded, the program or the application causing a terminal to execute the method according to claim 1.

16. A terminal in which a program or an application for smart devices is installed and includes a screen to which a touch screen is applied, the program or the application causing the terminal to execute the method according to claim 1.

* * * * *